United States Patent
Han et al.

(10) Patent No.: US 12,505,098 B2
(45) Date of Patent: Dec. 23, 2025

(54) APPARATUS AND METHOD FOR PROCESSING NATURAL LANGUAGE QUERY ABOUT RELATIONAL DATABASE USING TRANSFORMER NEURAL NETWORK

(71) Applicant: POSTECH Research and Business Development Foundation, Pohang-si (KR)

(72) Inventors: Wook Shin Han, Pohang-si (KR); Hyuk Kyu Kang, Pohang-si (KR); Hyeon Ji Kim, Pohang-si (KR)

(73) Assignee: POSTECH RESEARCH AND BUSINESS DEVELOPMENT FOUNDATION, Pohang-si (KR)

( * ) Notice: Subject to any disclaimer, the term of this patent is extended or adjusted under 35 U.S.C. 154(b) by 310 days.

(21) Appl. No.: 17/964,807

(22) Filed: Oct. 12, 2022

(65) Prior Publication Data
US 2023/0169075 A1    Jun. 1, 2023

(30) Foreign Application Priority Data

Nov. 30, 2021 (KR) .................. 10-2021-0169562
Sep. 19, 2022 (KR) .................. 10-2022-0117575

(51) Int. Cl.
*G06F 16/2452* (2019.01)
*G06F 16/242* (2019.01)

(52) U.S. Cl.
CPC .... *G06F 16/24522* (2019.01); *G06F 16/2433* (2019.01)

(58) Field of Classification Search
CPC .................. G06F 16/24522; G06F 16/2433
See application file for complete search history.

(56) References Cited

U.S. PATENT DOCUMENTS 6,751,617 B1 *  6/2004  Anfindsen ........... G06F 16/2343
                                              710/200
6,772,154 B1 *  8/2004  Daynes ............... G06F 16/2343
                                              710/200

(Continued)

FOREIGN PATENT DOCUMENTS

KR    10-2150908 B1    9/2020
KR    10-2277787 B1    7/2021
KR    10-2345568 B1   12/2021

OTHER PUBLICATIONS

Vaswani, et al. "Attention is all you need," Advances in neural information processing systems 30 (2017). 15 pages.

*Primary Examiner* — Robert W Beausoliel, Jr.
*Assistant Examiner* — Susan F Rayyan
(74) *Attorney, Agent, or Firm* — Morgan, Lewis & Bockius LLP

(57) ABSTRACT

Disclosed is a natural language query processing apparatus comprising, a processor that receives a natural language query input by a user and generates a structured query based on the natural language query, wherein the processor, when generating the structured query based on the natural language query, generates the structured query using a natural language processing result for the natural language query, a schema relationship extracted based on a relationship between sub-databases in a database related to the natural language query, and a cross-attention result generated between the natural language processing result and the schema relationship.

20 Claims, 14 Drawing Sheets

(56) References Cited

U.S. PATENT DOCUMENTS

| | | | | |
|---|---|---|---|---|
| 10,719,667 | B1* | 7/2020 | Roy | G06F 40/40 |
| 10,997,210 | B1* | 5/2021 | Chu | G06Q 30/0185 |
| 11,042,541 | B2* | 6/2021 | Verma | G06F 16/256 |
| 11,676,410 | B1* | 6/2023 | Sandu | G06V 30/416 |
| | | | | 382/156 |
| 11,727,243 | B2* | 8/2023 | Zhang | G06N 3/08 |
| | | | | 706/11 |
| 12,050,983 | B2* | 7/2024 | Chowdhery | G06N 3/045 |
| 12,265,528 | B1* | 4/2025 | Lan | G06F 16/243 |
| 2004/0193619 | A1* | 9/2004 | Venkatachary | H04L 45/00 |
| 2008/0077570 | A1* | 3/2008 | Tang | G06F 16/3346 |
| | | | | 707/999.005 |
| 2013/0262361 | A1* | 10/2013 | Arroyo | G06F 16/3344 |
| | | | | 706/46 |
| 2018/0181613 | A1* | 6/2018 | Acharya | G06F 16/243 |
| 2018/0336198 | A1* | 11/2018 | Zhong | G06N 3/08 |
| 2018/0349377 | A1* | 12/2018 | Verma | G06N 3/045 |
| 2020/0073983 | A1* | 3/2020 | Sen | G06F 16/243 |
| 2020/0257679 | A1* | 8/2020 | Sheinin | G06N 3/08 |
| 2021/0191936 | A1* | 6/2021 | Khorasani | G06F 16/288 |
| 2022/0067037 | A1* | 3/2022 | Ranganathan | G10L 15/22 |
| 2022/0108169 | A1* | 4/2022 | Saha | G06N 3/088 |
| 2022/0114200 | A1* | 4/2022 | Johnston | H04M 3/527 |
| 2022/0292262 | A1* | 9/2022 | Japa | G06F 16/90332 |
| 2022/0366133 | A1* | 11/2022 | Potash | G06F 40/216 |
| 2022/0382975 | A1* | 12/2022 | Gu | G06F 40/216 |
| 2022/0405480 | A1* | 12/2022 | Huang | G06F 40/166 |
| 2023/0135659 | A1* | 5/2023 | Wu | G06N 3/044 |
| | | | | 706/21 |
| 2023/0169074 | A1* | 6/2023 | Kim | G06F 16/24522 |
| | | | | 704/9 |
| 2023/0186025 | A1* | 6/2023 | John | G06F 40/40 |
| | | | | 704/9 |

* cited by examiner

APPARATUS AND METHOD FOR PROCESSING NATURAL LANGUAGE QUERY ABOUT RELATIONAL DATABASE USING TRANSFORMER NEURAL NETWORK

CROSS REFERENCE TO RELATED APPLICATION

The present application claims priority to Korean Patent Application No. 10-2021-0169562, filed Nov. 30, 2021, and the Korean Patent Application No. 10-2022-0117575, filed Sep. 19, 2022, the entire contents of which are incorporated herein for all purposes by these references.

BACKGROUND

1. Field of the Invention

The present disclosure relates to apparatus and method for processing query about database and technology generates standardized/structured queries based on natural language queries. Especially, the present disclosure relates the technologies generate standardized/structured queries based on natural language queries using transformer neural networks and relational database.

2. Related Art

Recently, the widespread Internet has exposed users to copious amounts of information. In order to acquire only the information the user is interested in among such copious amounts of information, a search must be conducted effectively.

A search is conducted in response to a query. A typical query and answer system provides an answer as a result of a question. It is very difficult to accurately inquire and search for the information requested by the information requester.

In order to achieve the desired result, the query is required to be structured with a standard. However, the reality is that it is not easy for most users to create a structured query by themselves because creating a structured query requires expert knowledge about standards/rules.

For this reason, there have been attempts to interpret/convert the natural language queries created by users into standardized/structured queries.

Korean Patent Registration No. 10-2150908 "method and system for analysis of natural language query" proposed a query processing method that more clearly recognizes the user's intention and effectively matches the user's intention in interpreting natural language queries.

However, even with this conventional technology, the process of converting a natural language query into a structured query is not perfectly conducted, and there is a need of an effective technique for converting a natural language query into a structured query.

SUMMARY OF THE INVENTION

An object of the present invention to solve the above problems is to provide an apparatus and method for encoding a natural language query and relational database into a meaning/meaningful representation based on a transformer neural network that is available in the case of using structured data such as database as well as unstructured data, as a search system that is expected to be applied not only to a database management system but also to a search system in the future and as a technology searching for relevant data and answer in response of a keyword or a query related to the information requested by the user.

An object of the present invention is to provide a query response result desired by a user by automatically generating a structured query even when a user inputs a natural language query without knowledge of the structured query.

An object of the present invention is to generate a structured query matching a user's intention and provide a query response result by pre-analyzing and encoding schema information that can be obtained only from a natural language query input by a user.

An object of the present invention is to advance a process of generating a structured query and query response result in the case where a user inputs a natural language query.

An object of the present invention is to propose a new cross-attention-based neural network structure that advances the process of generating a structured query in response to a natural language query input.

An object of the present invention is to propose a schema relation extraction technique based on the relationship between sub-databases that advances the process of generating a structured query in response to a natural language query input.

According to an exemplary embodiment of the present disclosure, A natural language query processing apparatus comprising: a processor that receives a natural language query input by a user and generates a structured query based on the natural language query, wherein the processor, when generating the structured query based on the natural language query, generates the structured query using: a natural language processing result for the natural language query, a schema relationship extracted based on a relationship between sub-databases in a database related to the natural language query, and a cross-attention result generated between the natural language processing result and the schema relationship.

The processor may generate the structured query using a first cross-attention result indicating relevance of the natural language processing result to the schema relationship and a second cross-attention result indicating a relevance of the schema relationship to the natural language processing result, wherein the cross-attention result comprises the first cross-attention result and the second cross-attention result.

The apparatus may further comprise: a natural language processing model generating the natural language processing result based on the natural language query; and a schema encoder model outputting the schema relationship.

The schema encoder model may output a schema meaning representation as the schema relationship based on an input schema graph, and the natural language processing model receives an input of a preprocessing result of the natural language query and outputs a natural language element meaning representation as the natural language processing result.

The apparatus may further comprise: a first cross-attention layer generating a first cross-attention result indicating relevance of the natural language processing result to the schema relationship; and a second cross-attention layer generating a second cross-attention result indicating a relevance of the schema relationship to the natural language processing result, wherein the cross-attention result comprises the first cross-attention result and the second cross-attention result.

The natural language processing model may comprise a first internal attention layer having a self-attention function inside thereof, and the schema encoder model comprises a second internal attention function layer having at least one of a self-attention function and a cross-attention function inside thereof.

The processor may block update of parameters inside of the natural language processing model based on an output of the first internal attention layer.

The processor may block update of parameters inside of the natural language processing model based on the cross-attention result.

The apparatus may further comprise a decoder layer generating the structured query based on the cross-attention result.

According to an exemplary embodiment of the present disclosure, a natural language query processing method executed by a computing system including a processor, the method comprising: receiving a natural language query input by a user; and generating a structured query based on the natural language query, wherein the step of generating the structured query comprises: acquiring a natural language processing result for the natural language query: acquiring a schema relationship extracted based on a relationship between sub-databases in a database related to the natural language query: acquiring a cross attention result generated between the natural language processing result and the schema relationship; and generating the structured query using the cross-attention result.

The step of acquiring the cross-attention result may comprise: acquiring a first cross-attention result indicating relevance of the natural language processing result to the schema relationship; and acquiring a second cross-attention result indicating a relevance of the schema relationship to the natural language processing result.

The step of acquiring the schema relationship may comprise acquiring a schema meaning representation as the schema relationship based on an input schema graph, and the step of acquiring the natural language processing result comprises receiving an input of a preprocessing result of the natural language query and acquiring a natural language element meaning representation as the natural language processing result.

The step of acquiring the natural language processing result may be performed in a state where update of parameters inside of a natural language processing model based on an output of an internal attention layer is blocked.

The step of acquiring the natural language processing result may be performed in a state where update of parameters inside of a natural language processing model based on the cross-attention result is blocked.

According to an exemplary embodiment of the present disclosure, a natural language query processing method executed by a computing system including a processor, the method comprising: extracting a schema relationship between sub-databases in a database related to a natural language query as one of one-to-one correspondence and one-to-many correspondence; and generating a structured query from the natural language query based on the schema relationship.

The method may further comprise predicting the schema relationship as one of a mandatory relationship and an optional relationship through comparison between the sub-databases.

The method may further comprise encoding the schema relationship using a first natural language module corresponding to a first sub-database among the sub-databases and a second natural language model corresponding to a second sub-database among the sub-databases.

The method may further comprise pre-encoding at least part of the schema relationship using masked column modeling for part of the sub-databases.

The method may further comprise acquiring a natural language processing result based on the natural language query. The step of generating the structured query may comprise: acquiring a cross attention result generated between the natural language processing result and the schema relationship; and generating the structured query using the cross-attention result.

The method further may comprise acquiring a natural language processing result based on the natural language query using a pre-trained language model. The step of acquiring the natural language processing result may be performed in a state where update of internal parameters of the language model is blocked.

DETAILED DESCRIPTION OF THE INVENTION

Figure 1:
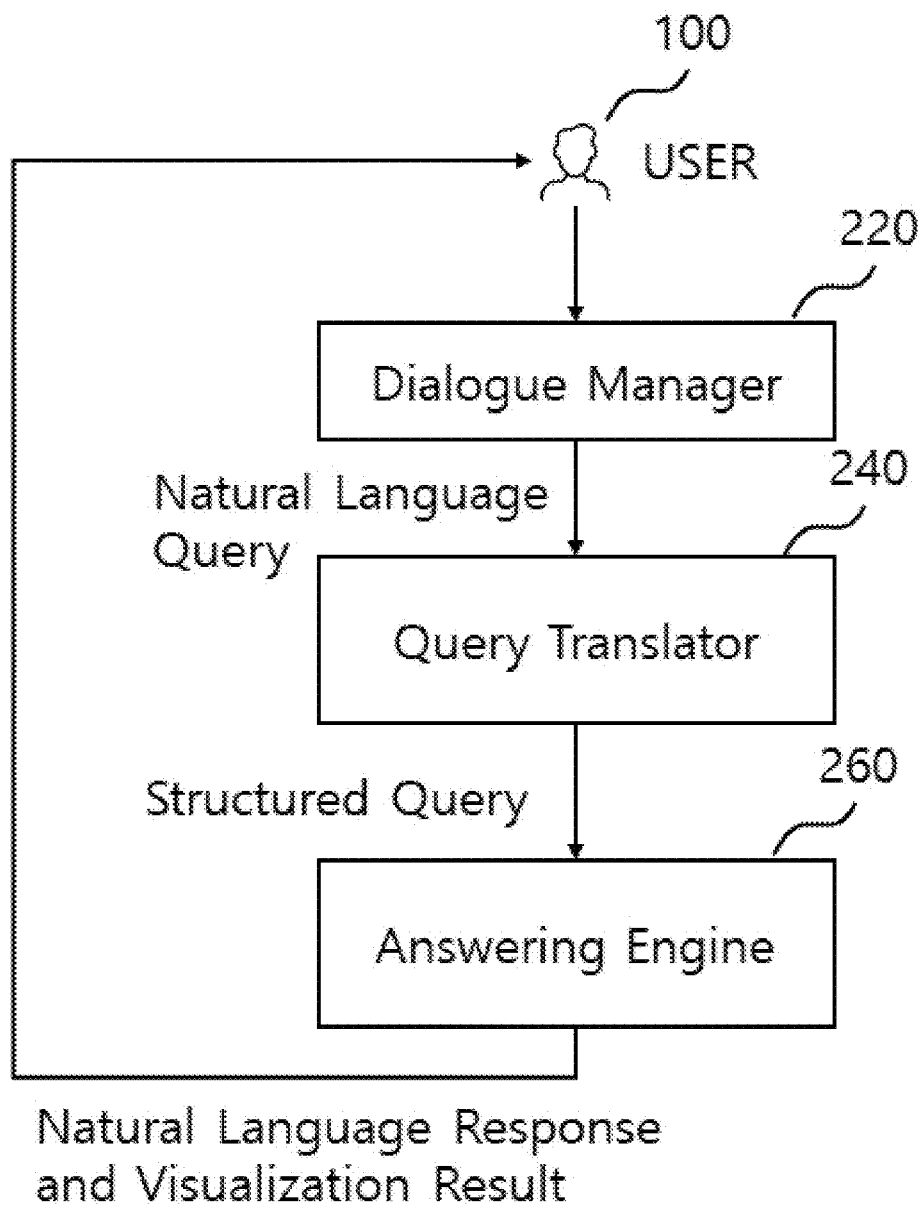
FIG. 1 is a conceptual diagram illustrating a system including a natural language query processing apparatus according to an embodiment of the present invention.

Exemplary embodiments of the present disclosure are disclosed herein. However, specific structural and functional details disclosed herein are merely representative for purposes of describing exemplary embodiments of the present disclosure. Thus, exemplary embodiments of the present disclosure may be embodied in many alternate forms and should not be construed as limited to exemplary embodiments of the present disclosure set forth herein.

Accordingly, while the present disclosure is capable of various modifications and alternative forms, specific exemplary embodiments thereof are shown by way of example in the drawings and will herein be described in detail. It should be understood, however, that there is no intent to limit the present disclosure to the particular forms disclosed, but on the contrary, the present disclosure is to cover all modifications, equivalents, and alternatives falling within the spirit and scope of the present disclosure. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present disclosure. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (i.e., "between" versus "directly between," "adjacent" versus "directly adjacent," etc.).

The terminology used herein is for the purpose of describing particular exemplary embodiments only and is not intended to be limiting of the present disclosure. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this present disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Since too much detailed description of the related arts may obscure the ideas of the present invention, the detailed explanation of the related art can be omitted. The skilled person can recognize the differentiated feature of the present invention from the related arts, for example, "Attention Is All You Need", Ashish Vaswani et al., 31st Conference on Neural Information Processing Systems (NIPS 2017), KR 10-2150908 "method and system for natural language queries analysis", KR 10-2277787 "method of prediction of columns and tables used for translation of SQL queries from natural language based on the neural network, et al.

The matters disclosed in the related Arts can be included as a at least a part of the present invention within the scope consistent with the purpose of the present invention.

Hereinafter, exemplary embodiments of the present disclosure will be described in greater detail with reference to the accompanying drawings. In order to facilitate general understanding in describing the present disclosure, the same components in the drawings are denoted with the same reference signs, and repeated description thereof will be omitted.

FIG. 1 is a conceptual diagram illustrating a system including a natural language query processing apparatus according to an embodiment of the present invention.

With reference to FIG. 1, the system may be understood as a system for translating a natural language query for a database. Also, the system may be understood as a system that automatically generates a response result corresponding to a natural language query when the user 100 inputs a natural language query to the database.

The query translator 240 in the system may include a transformer neural network therein and may encode a natural language query and schema extraction result of a relational database into a meaning/meaningful representation based on the transformer neural network. The query translator 240 may decode the encoded result, convert it into a structured query, and pass it to the answer engine 260.

In order to use a general database management system (DBMS), a general user has to understand the structure of the database and the syntax for creating structured queries. In this case, the general user needs knowledge of the schema according to the structure of the database in order to properly write and input a structured query. Here, the structured query may be a well-known Structured Query Language (SQL) or another known form of structured queries. The schema knowledge and structured query knowledge required by general users will be described later with reference to the example of FIG. 3.

In the system of FIG. 1, a user 100 may not require direct knowledge of structured queries and/or schemas. The user 100 may input a natural language query to the dialogue manager 220. Here, the natural language query may be text input via a keyboard/keypad or voice input. In the case of voice input, a preprocessing process of converting the voice recognition result into a natural language query may be performed by the dialogue manager 220.

The dialogue manager 220 may transmit the query formed in the natural language to the query translator 240. The query translator 240 may translate the natural language query input into a structured query. The query translator 240 may pass the structured query to the answering engine 260.

The answering engine 260 may include functions such as known artificial intelligence-based interactive assistants. The answering engine 260 may provide search results corresponding to the structured query in the database. The answering engine 260 may provide the search results to the user 100 as natural language responses and/or visualized results.

Although not shown in FIG. 1 for convenience of explanation, the dialogue manager 220, the query translator 240, and the answering engine 260 of FIG. 1 are electronically connected to at least one processor and may be managed and controlled by the processor. The processor is electronically connected to at least one memory and executes at least one instruction stored in the memory to provide the functions of the dialogue manager 220, the query translator 240, and the answering engine 260 of FIG. 1. According to another embodiment of the present invention, at least some of the dialogue manager 220, the query translator 240, and the answering engine 260 of FIG. 1 may be implemented in the form of dedicated hardware.

A system/apparatus according to an embodiment for achieving the object of the present invention may include a function of encoding a natural language query and a relational database into a meaningful representation based on a transformer neural network.

The system/apparatus may provide a voice recognition service capable of performing multilingual voice recognition with at least one artificial intelligence model and automatically recognize and process a user's speech in a situation where only a single language is recognizable due to hardware limitations of the terminal even with the necessity of multilingual voice recognition.

The system/apparatus may pass English (EN) and Korean (KO) audio inputs through a 7-layer Convolutional Neural Network (CNN) feature extractor and 24 layers of Transformer Encoder to extract voice feature information and then output voice results through a CTC Projection output layer capable of outputting Korean (KO), English (EN), or both Korean and English (ALL).

In the system/device, the output unit of each CTC Projection output layer is a Unicode unit corresponding to 1 byte (8 bits), and the final result may be generated by recombining them. In this case, byte unit information may be expressed as 0x00 to 0xff in an octal representation method. Unicode representations in bytes can represent all languages in the world as 256 (2^8) 8-bit (1 byte) combinations, so even if the number of supported languages increases, the overall model size can only increase by the CTC Projection output layer supporting 256 levels of output.

The system/device may be implemented such that all recognizable languages are commonly shared and each language has a separate CTC Projection output layer. When voice language classification is not certain, a universal (ALL) output layer in which all languages can be simultaneously learned and output may be used. Although having lower performance than the dedicated (KO or EN) output layer, the universal output layer may prevent a malfunction of generating an output of the wrong language when speech language is not properly recognized.

The system/device may be equipped with a speech language classification model to enhance the multilingual speech recognition performance.

The voice language classification model is based on the Wav2Vec2.0 model such that the system/device can divide the voice information into 25 ms (milliseconds) units to extract the voice information using the Wav2Vec2.0 model and classify the average value of extracted voice in 25 ms through the Projector layer (Mean Pooling operation).

The system/device may input the audio data received as input to the Wav2Byte speech recognizer and the Wav2Vec2.0-based speech language classifier, respectively, and select, when selecting the CTC Projection output layer for each language of the Wav2Byte-structured speech recognizer, an output layer with the output (language classification information) of the Wav2Vec2.0-based voice language classifier so as to generate the final speech recognition result. The system/device may generate a speech recognition result using the universal (ALL) language output layer instead of the dedicated language output layer to prevent malfunction when the confidence of speech language classification is less than 70%.

Figure 2:
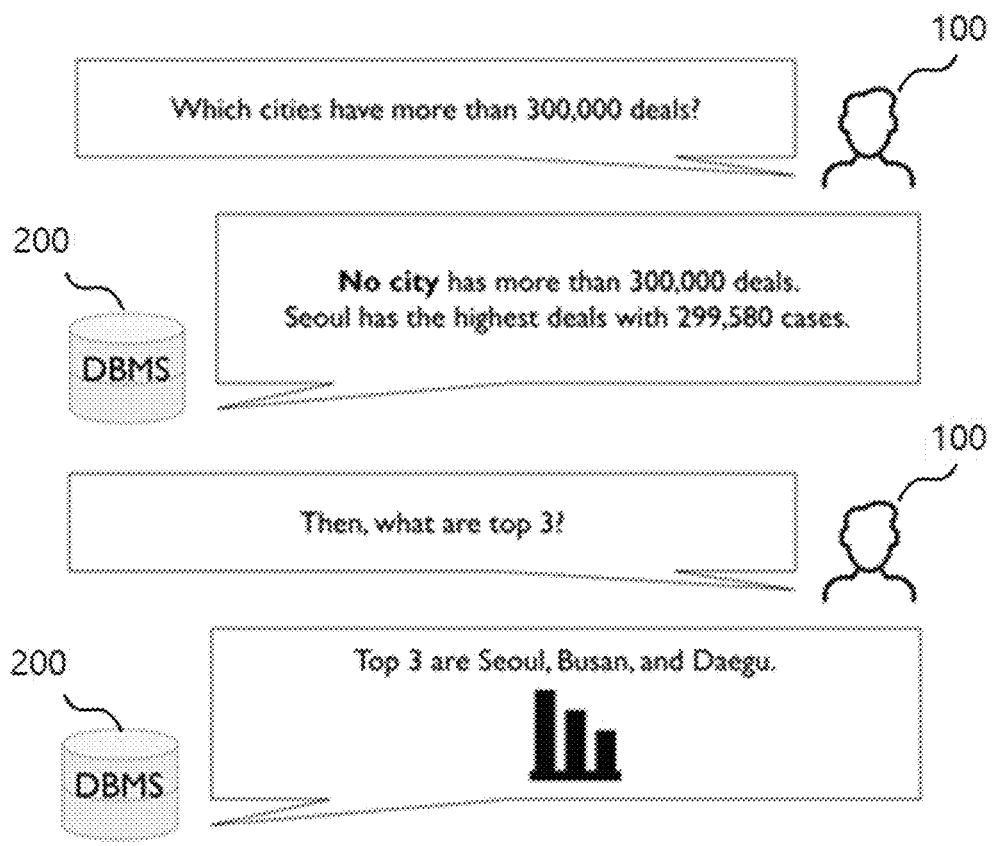
FIG. 2 is a conceptual diagram illustrating an example of a natural language processing scenario executed by an apparatus for processing a natural language query according to an embodiment of the present invention.

FIG. 2 is a conceptual diagram illustrating an example of a natural language processing scenario executed by an apparatus for processing a natural language query according to an embodiment of the present invention.

FIG. 2 illustrates a scenario in which a user 100 inputs a query and receives a search result using a database management system (DBMS) 200 and an interactive interface via the dialogue manager 220, the query translator 240, and the answering engine 260 of FIG. 1.

The user 100 may enter a natural language query for a city with an ATM transaction volume exceeding 300,000. The DBMS 200 may report that a city with a transaction volume exceeding 300,000 is not searched and that Seoul is searched as a city having 299,580 transactions closest to 300,000. Although assuming that the user 100 is an employee of a bank or a financial institution in FIG. 1, the spirit of the present invention is not construed as being limited to this assumption.

Here, with reference to FIGS. 1 and 2 together, at least one of the query translator 240 and the answering engine 260 of FIG. 1 may additionally generate an auxiliary structured query and provide the user 100 with an intelligent response thereto based on the search result in a cooperative manner or a standalone manner. For example, if an appropriate number of results are found as a result of the query search, the original search results may be provided to the user 100 as they are, and if an appropriate number of results are not found, the auxiliary search results may be provided to the user 100 together.

The user 100 may input a second query after receiving the result of answering the first question. In this case, the user 100 may input a natural language query omitting part of what the search is for, and the DBMS 200 may generate a structured query meeting the intention of the user 100 based on the schema relationship, retrieve the query from the database, and provide the user 100 with the query response result.

Figure 3:
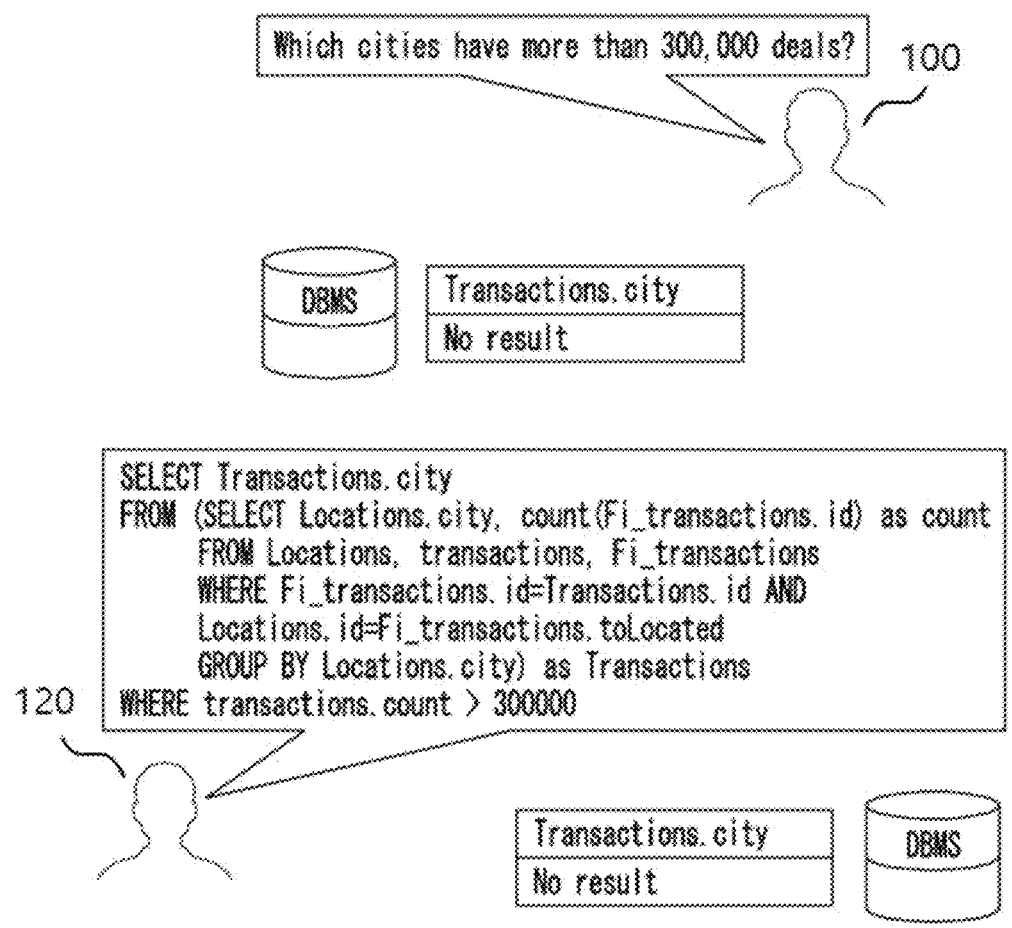
FIG. 3 is a conceptual diagram illustrating an equivalent query generation process by a virtual user for explaining a natural language query processing process executed by a natural language query processing apparatus according to an embodiment of the present invention.

FIG. 3 is a conceptual diagram illustrating an equivalent query generation process by a virtual user for explaining a natural language query processing process executed by a natural language query processing apparatus according to an embodiment of the present invention.

With reference to FIG. 3, the user 100 may input a natural language query to the natural language query processing apparatus according to an embodiment of the present invention. Here, a virtual user 120 is assumed to describe the operation of the natural language query processing apparatus. The virtual user 120 may generate a structured query in response to the natural language query of the user 100.

The structured query generated by the virtual user 120 may be a query equivalent to the natural language query of the user 100 in the system of FIG. 3.

Explaining the embodiment of FIG. 3 differently, in the conventional technology, the virtual user 120 needed to directly write and input a structured query as shown in FIG. 3. Here, it can be seen that the virtual user 120 must be familiar with the three table schema and be able to write complex nested SQL queries in order to check the city where 300,000 or more transactions have occurred.

However, the public does not know the SQL language, and it is not easy for even an expert with SQL query knowledge to write a query that accurately reflects their intentions, even considering the specificity of the database.

Also, it is difficult for the user of the DBMS of the conventional technology to check whether the SQL query is properly written.

For example, even if the virtual user 120 correctly writes a SQL-based query, if the query response result returned by the DBMS is provided as no search result, the user may not be sure that the SQL query has been correctly written.

However, in the embodiment of FIG. 3, the user 100 can make a query to the DBMS 200 in natural language and the user 200 can accurately express the desired information verbally, resulting in no necessity of understanding the schema of complex sub-databases (tables).

According to an embodiment of the present invention, a neural network-based natural language processing technique may be used. Such natural language processing technique may use a known transformer neural network or the like and may be included as a part of the configuration of the present invention if necessary.

In recent years, several neutral network-based natural language query translation techniques have emerged. In the early days, studies based on recurrent neural networks/Long Short Term Memory networks were introduced, but the problem of gradient exploding/vanishing, which occurs when the input length became longer, caused to use a transformer structure neural network in the recent research.

Relation Aware Transformer-Structured Query Language (RAT-SQL) is a representative technique that utilizes the transformer structure. RAT-SQL is an encoder-decoder model that simultaneously puts a natural language query and schema into a pre-trained language model Bidirectional Encoder Representations from Transformers (BERT) to compute the meaning representation, and uses explicit relationship information between input tokens in a relational-aware transformer neural network to compute the final meaning representation of the tokens.

In order to input a natural language query and schema into a transformer neural network of the conventional technique, schema information should be converted into continuous words and then tokenized. RAT-SQL lists the table names and column names included in the schema in a line, and connects to the natural language query with a special token called [September] (separator) in between.

In addition, in order to use the relation-aware transformer, it is necessary to extract explicit relationships between tokens, the relationship between schema tokens uses a link relationship on the schema graph, and the relationship between natural language queries and schema tokens is found through schema linking. With the final meaning representation computed in this way, the decoder sequentially generates SQL phrases.

After RAT-SQL, various natural language query translation techniques have been additionally introduced, but most of them follow the encoder method of RAT-SQL. A method of effectively initializing model parameters in the encoding method has been proposed, and then a decoder has been newly proposed.

The RAT-SQL model can significantly improve the translation performance of natural language queries by using the pre-trained language model BERT.

However, there are several problems in the method that the conventional technique RAT-SQL uses BERT.

First, BERT is trained to receive natural language sentences, and RAT-SQL receives input by listing table and column names along with natural language query sentences. In this case, BERT needs additional learning to extract effective meaning representation for new input types, but there is not much training data for natural language queries and schema pairs.

Second, there is a shortcoming in that the BERT input length is limited to 512 tokens such that the current structure cannot be applied to a schema with a large number of columns and tables.

Third, there is a shortcoming in that the relationship information of input tokens cannot be used effectively.

RAT-SQL, as a conventional technique, allows explicitly inputting the connection relationship between tokens into the relation-aware transformer in order to utilize the connection relationship between tokens including columns and tables.

However, there is a problem in that the relation-aware transformer as a module used at the rear part of the encoder cannot utilize the relationship information between tokens at all in the front part where the input token is first given. This model structure is highly likely to affect rear parts of the model by creating incorrect intermediate meaning representations.

There are other conventional techniques using metadata or schema to advance the process of interpreting a natural language query. For example, Korea Patent Registration No. 10-2150908 "method and system for analysis of natural language query" described above discloses a configuration that embodies the first types of the respective natural language terms determined based on morpheme analysis into the second types/component patterns as more detailed sub-patterns using a schema.

However, although these conventional techniques can extract the meaning of each term constituting a natural language query in more detail, they still cannot extract all of the information necessary to generate a structured query (e.g., SQL query).

In order to solve the problems of the conventional techniques, the present invention proposes a new internal structure capable of enhancing a natural language query processing apparatus.

Figure 4:
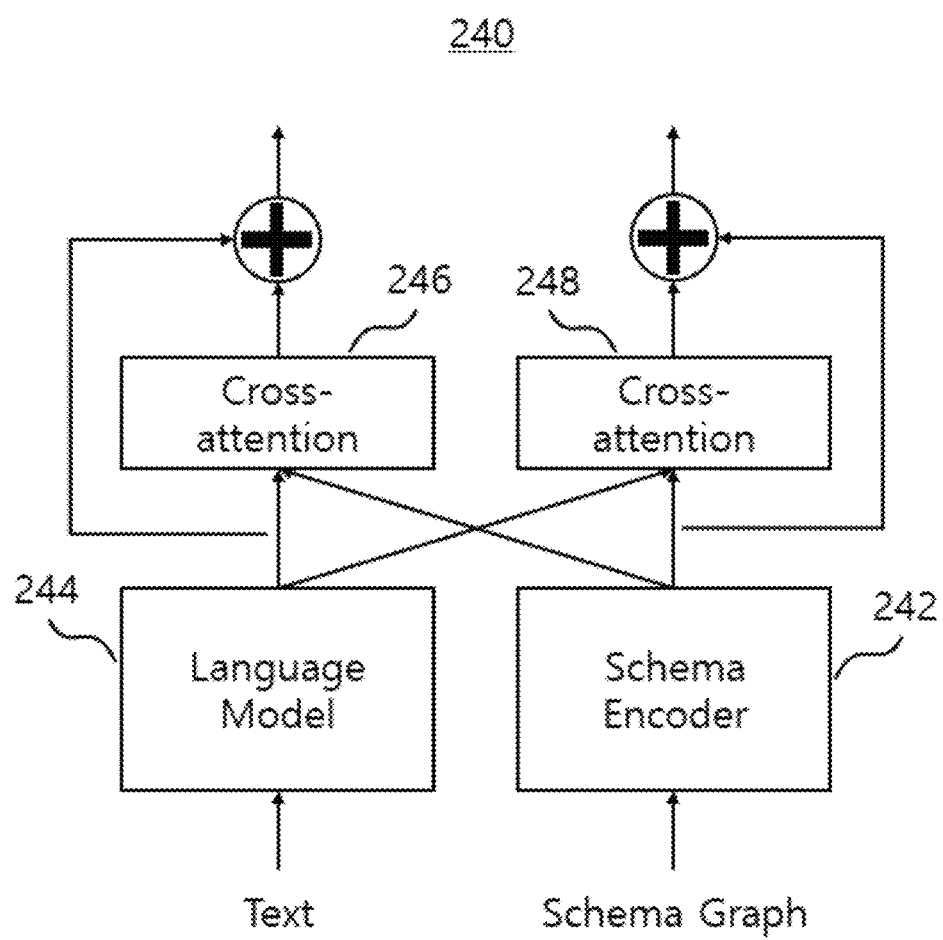
FIG. 4 is a conceptual diagram illustrating a language model, a schema encoder, and a cross-attention layer for natural language processing as an internal structure of a natural language query processing apparatus according to an embodiment of the present invention.

FIG. 4 is a conceptual diagram illustrating a language model, a schema encoder, and a cross-attention layer for natural language processing as an internal structure of a natural language query processing apparatus according to an embodiment of the present invention.

FIG. 4 is a conceptual diagram for explaining a process for the apparatus of encoding a natural language query and relational database into a meaning/meaningful representation based on the transformer neural network to encode each of the natural language query and the schema and then re-compute the meaning representation in consideration of the relationship between the natural language query and the schema. Although not shown in FIG. 4, each component of FIG. 4 may be electronically connected to a processor that controls and manage the operation and function of each component.

With reference to FIG. 4, the natural language query processing apparatus according to an embodiment of the present invention may be the query translator 240 that receives a natural language query input by a user 100 and generates a structured query based on the natural language query.

The natural language processing apparatus according to an embodiment of the present invention may generate a structured query using 1) a natural language processing result for a natural language query and 2) a cross-attention result generated between schema relationships extracted based on the relationship between sub-databases in the database related to the natural language query, when generating the structured query based on the natural language query.

The natural language processing apparatus according to an embodiment of the present invention may generate a structured query using a first cross-attention result indicating a relevance of a natural language processing result to a schema relationship and a second cross-attention result indicating a relevance of the schema relationship to the natural language processing result, the cross-attention results may include the first cross-attention result and the second cross-attention result.

The natural language processing apparatus according to an embodiment of the present invention may further include a language model 244 as a natural language processing model for generating a natural language processing result based on the natural language query and a schema encoder 242 model for outputting schema relationships.

The schema encoder 242 model may output a schema meaning representation as a schema relationship based on the input schema graph.

The language model 244, as a natural language processing model, may receive a preprocessing result of a natural language query and output a meaning representation of natural language elements (e.g., parsed words, morphemes, and tokens) as a natural language processing result.

The natural language processing apparatus according to an embodiment of the present invention may further include a first cross-attention layer 246 for generating a first cross-attention result indicating a relevance of the natural language processing result to the schema relationship and a second cross-attention layer 248 for generating a relevance of the schema relationship to the natural language processing result.

The language model 244, as a natural language processing model, may include a first internal attention layer having a self-attention function, and the schema encoder 242 model may include a second internal attention layer having at least one of self-attention and cross-attention functions.

Figure 5:
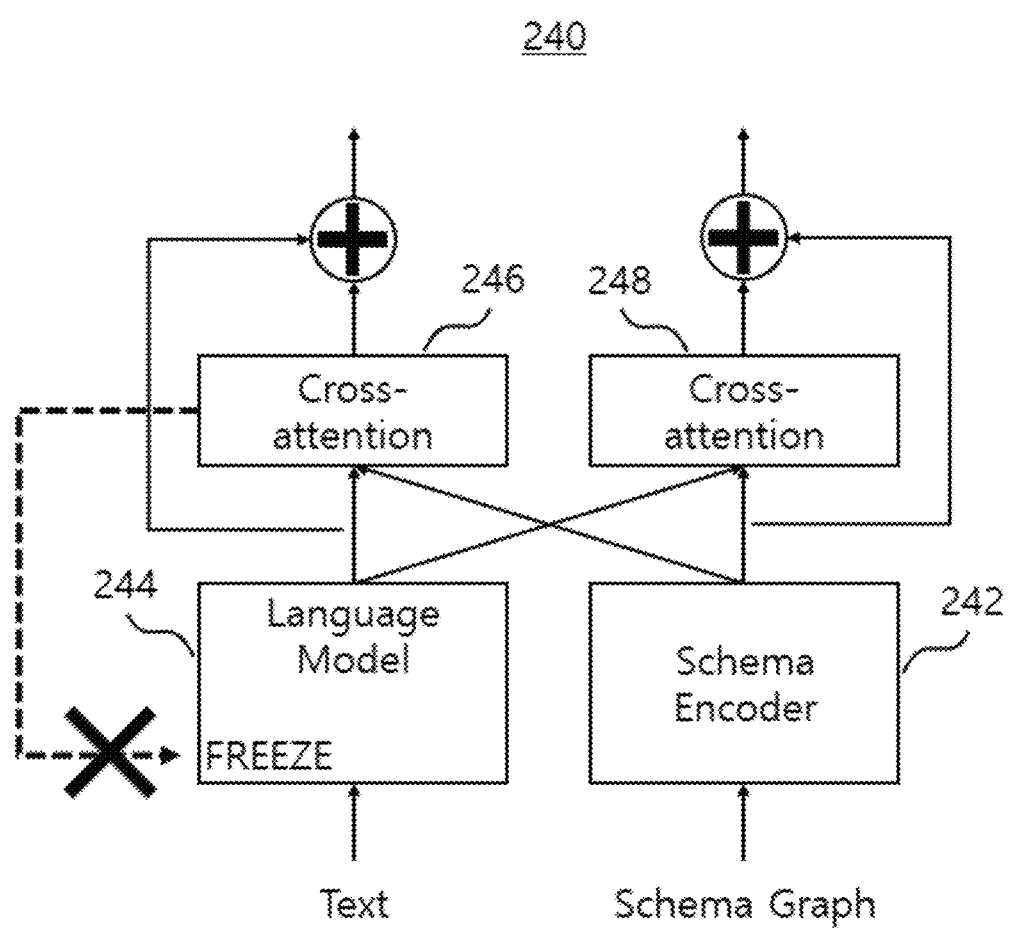
FIG. 5 is a conceptual diagram illustrating an internal structure of a natural language processing apparatus, in a case where an update of internal parameters of a language model is blocked, according to an embodiment of the present invention.

FIG. 5 is a conceptual diagram illustrating an internal structure of a natural language processing apparatus, in a case where an update of internal parameters of a language model is blocked, according to an embodiment of the present invention.

The natural language processing apparatus according to an embodiment of the present invention may block the update of parameters inside the natural language processing model/language model 244 based on the output of the first internal attention layer.

The natural language processing apparatus according to an embodiment of the present invention may block the update of parameters inside the natural language processing model/language model 244 based on the cross-attention result.

With reference to FIG. 5, as the natural language processing process and the schema encoding process are separated, only the schema encoder 242 model can pre-train independently of the natural language processing process. This is a major difference that distinguishes the present invention from the conventional technique and is also a factor that can further enhance the natural language query processing method according to an embodiment of the present invention.

By separating the pre-training process of the schema encoder 242 model from the natural language processing process, the schema encoder 242 model can be trained unsupervised by generating a schema from information in a sub-database (table) that can be easily obtained on the web. By pre-training the schema encoder 242 model, it is possible to solve the problem of the conventional technique in that the schema input shape does not match the pre-trained model input shape.

Two learning courses for pre-training may use masked column modeling and/or table relationship prediction.

Similarly to mask language modeling, masked column modeling capable of learning relevance within a table may be performed by masking the table column name with a 15% probability and then predicting the corresponding column name. Here, the meaning representation used for predicting the name of the column may be a meaning representation obtained through a fully-connected layer of the two layers after passing through BERT and may be controlled to solve the classification problem in predicting the name of the masked column.

The table relationship prediction technique capable of being performed as a learning to understand the connectivity between tables may be performed in such a way of masking the relationship information entering the relationship-aware transformer with the probability of 15% and controlling the model to solve the classification problem to match which relationship should be placed in the corresponding position.

A more detailed process of masked column modeling and/or table relationship prediction will be described later with reference to FIGS. 10 to 13.

With reference back to FIGS. 4 and 5, the natural language query processing apparatus according to an embodiment of the present invention may generate an encoding result by individually considering the natural language relationship and schema relationship of the natural language query in the encoding step. The language model 244 and the schema encoder 242 may compute meaning representations for their respective inputs independently of each other.

In order to effectively create a structured query based on a natural language query, it is important to accurately recognize the relationship between the schema and the natural language. To this end, the natural language query processing apparatus according to an embodiment of the present invention may use cross-attention.

The natural language query processing apparatus according to an embodiment of the present invention may be configured such that information between two inputs (a natural language processing result and a schema relationship) each encoded with cross-attention is used in a cross-referenced manner. A formula for calculating an attention score in cross-attention may include r indicating relationship information. Here, a relationship computed through schema linking may be used as the relationship information r. Using cross-attention, the final meaning representation of natural language processing relationships and schema relationships can be computed.

Through this configuration according to an embodiment of the present invention, it is possible to improve the performance of a translation system by more accurately computing the meaning representation of the natural language processing result and the database schema required for translating natural language queries into standardized/structured queries such as SQL queries.

Figure 6:
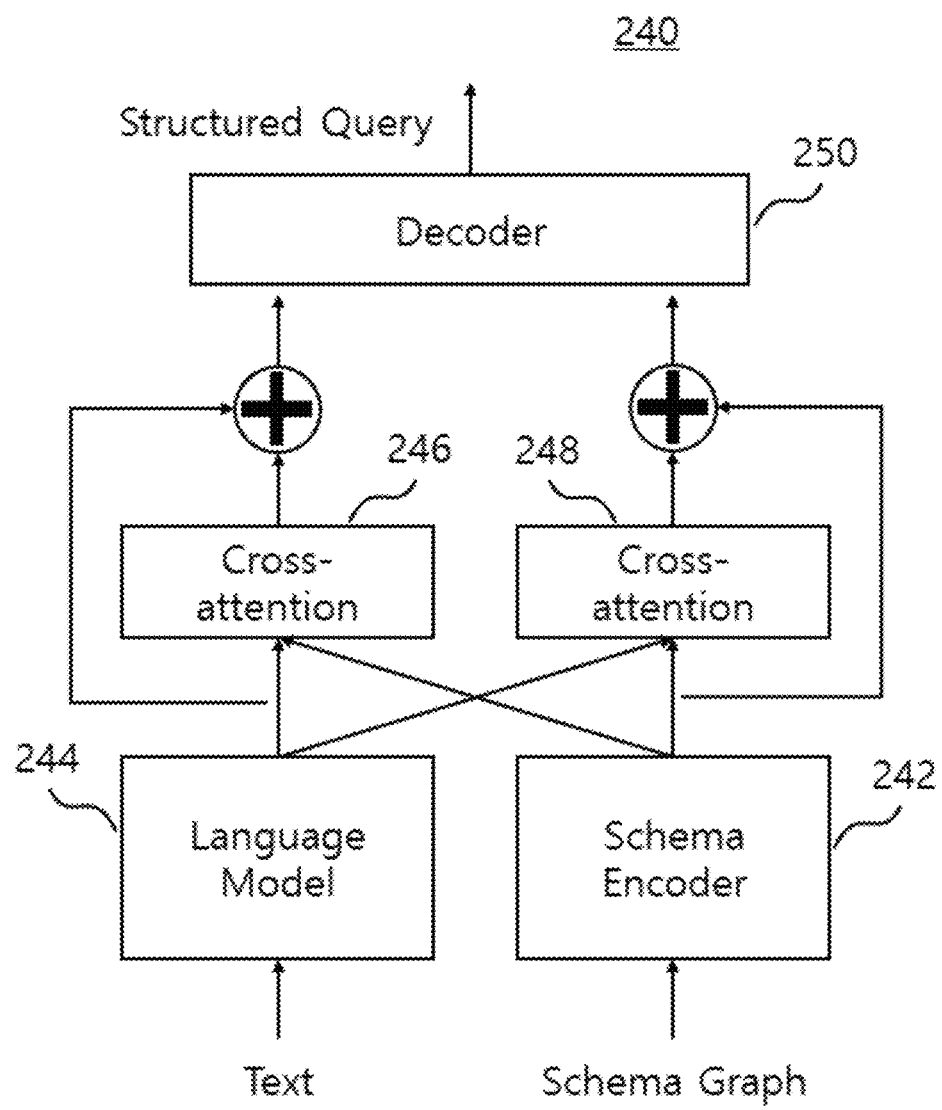
FIG. 6 is a conceptual diagram illustrating an internal structure of a natural language query processing apparatus further including a decoder layer generating a structured query based on a cross-attention result according to an embodiment of the present invention.

FIG. 6 is a conceptual diagram illustrating an internal structure of a natural language query processing apparatus further including a decoder layer generating a structured query based on a cross-attention result according to an embodiment of the present invention.

The natural language processing apparatus according to an embodiment of the present invention may further include a decoder layer 250 for generating a structured query based on a cross-attention result.

With reference to FIGS. 4 to 6, in order to generate a structured query, a meaning representation may be additionally encoded by cross-referencing a natural language processing result in a natural language query and a schema relationship that may not be directly included in the natural language query. The schema relationship may include both information included in the natural language query and information not included in the natural language query.

Sub-database (table/column) information to be focused on for natural language query translation among schema relationships may be obtained using the second cross-attention 248 of the natural language processing result on the schema relationship. As a result, some tables/columns in the entire schema can be selected and used meaningfully.

It is possible to obtain information on which table/column is related to which element among the natural language elements (parsing result, word, morpheme, token) constituting the natural language query using the first cross-attention 246 of the schema relationship to the natural language processing result. In this case, a structured query may be generated using the meaning correspondence relationship between the words in the obtained natural language query and the table/column in the database.

Figure 7:
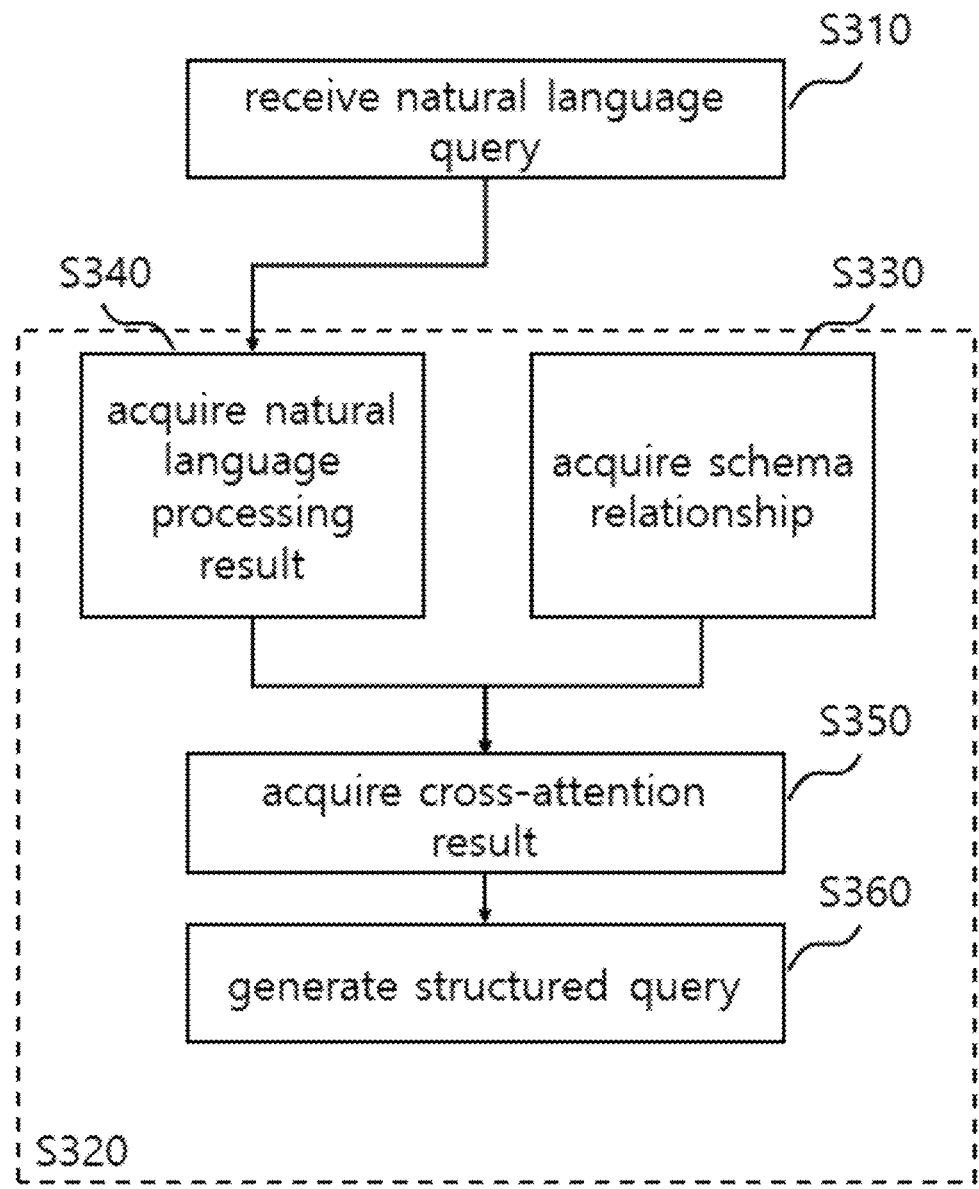
FIG. 7 is an operation flowchart illustrating a natural language query processing method executed by a natural language query processing apparatus according to an embodiment of the present invention.

FIG. 7 is an operation flowchart illustrating a natural language query processing method executed by a natural language query processing apparatus according to an embodiment of the present invention.

The natural language query processing method according to an embodiment of the present invention may be executed by a computing system including a processor. A natural language query processing method according to an embodiment of the present invention includes receiving, at step S310, a natural language query input by a user 100 and generating, at step S320, a structured query based on the natural language query, and step S320 of generating the structured query includes obtaining, at step S340, a natural language processing result for the natural language query, obtaining, at step S330, a schema relationship extracted based on a relationship between a sub-databases (table/column) in a database related to a natural language query, obtaining at step S350, a cross-attention result generated between a natural language processing result and a schema relationship, and generating, at step S360, a structured query using the cross-attention result.

Figure 8:
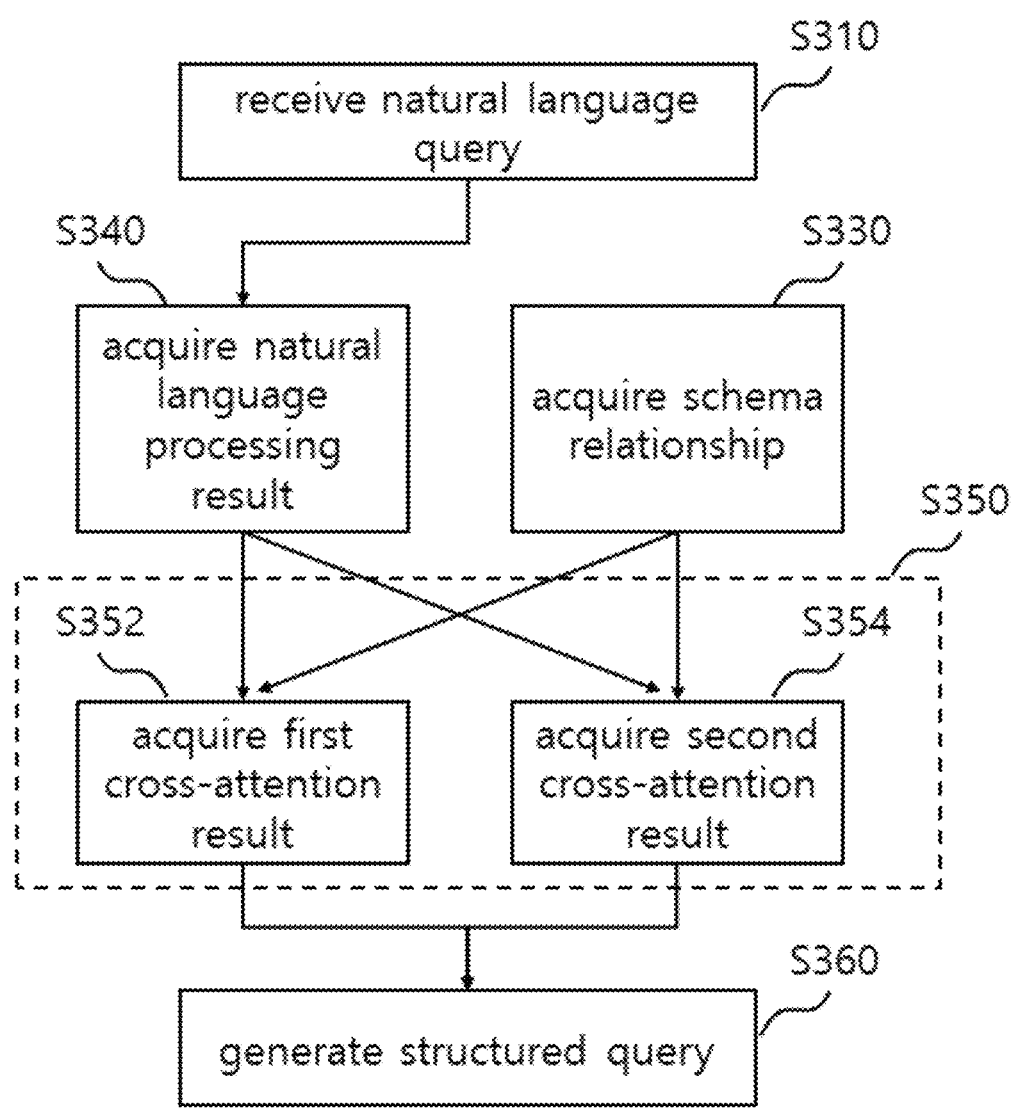
FIG. 8 is an operation flowchart illustrating operations before and after step S350 of FIG. 7 in more detail.

FIG. 8 is an operation flowchart illustrating operations before and after step S350 of FIG. 7 in more detail.

Step S350 of obtaining the cross-attention result includes obtaining, step S352, a first cross-attention result indicating a relevance of the natural language processing result to the schema relationship and obtaining, at step S354, a second cross-attention result indicating a relevance of the schema relationship to the natural language processing result.

In step S330 of acquiring the schema relationship, a schema meaning representation may be acquired as a schema relationship based on the input schema graph. In the step S340 obtaining the natural language processing result, a preprocessing result of a natural language query may be input, and a meaning representation of natural language elements (parsing results, words, morphemes, and tokens) may be obtained as a natural language processing result.

The step S340 of obtaining the natural language processing result may be performed in a state where the update of parameters inside the natural language processing model based on the output of the internal attention layer is blocked.

The step S340 of obtaining the natural language processing result may be performed in a state where the update of parameters in the natural language processing model based on the cross-attention result is blocked.

Figure 9:
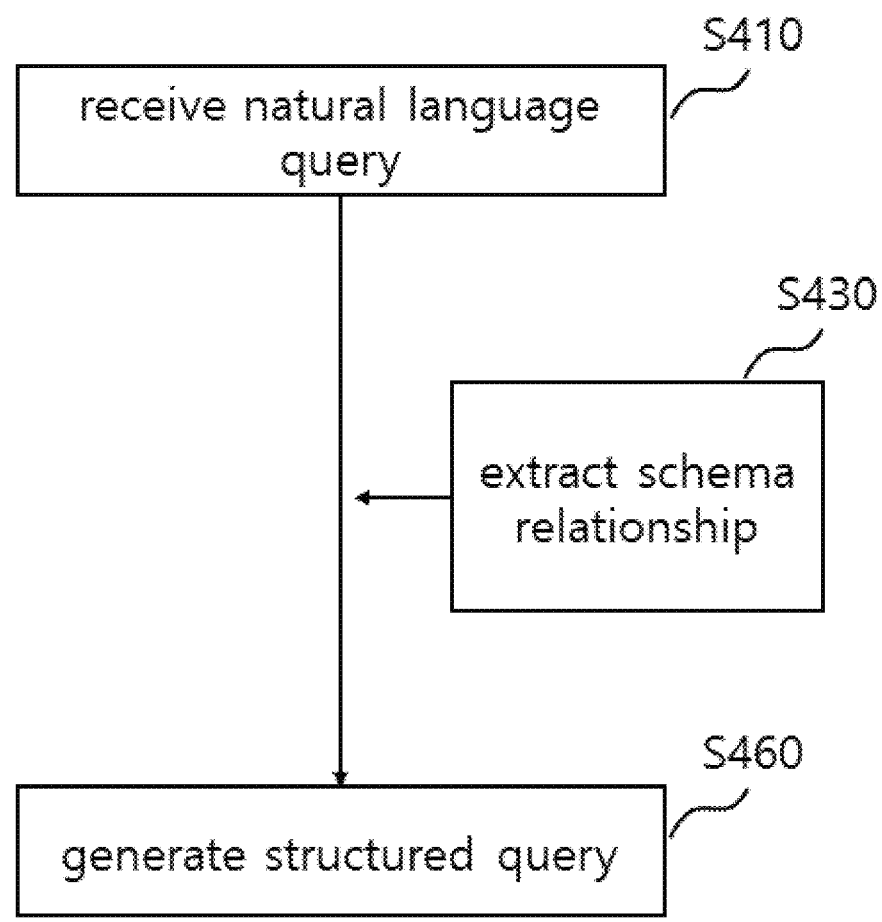
FIG. 9 is an operation flowchart illustrating a natural language query processing method according to another embodiment of the present invention.

FIG. 9 is an operation flowchart illustrating a natural language query processing method according to another embodiment of the present invention.

According to an embodiment of the present invention, the natural language query processing method executed by a computing system including a processor includes extracting, at step S430, a schema relationship between the sub-databases in the database related to the natural language query as one of a one-to-one correspondence and a one-to-many correspondence and generating, at step S460, a structured query from the natural language query based on the schema relationship. The natural language query processing method according to an embodiment of the present invention may further include receiving, at step S410, a natural language query.

The natural language query processing method according to an embodiment of the present invention may further include predicting a schema relationship as one of a mandatory relationship and an optional relationship through comparison between sub-databases.

The natural language query processing method according to an embodiment of the present invention may further include encoding a schema relationship using a first natural language model corresponding to a first sub-database among sub-databases and a second natural language model corresponding to a second sub-database among sub-databases.

The natural language query processing method according to an embodiment of the present invention may further include pre-encoding at least part of a schema relationship using masked column modeling to some of sub-databases.

The natural language query processing method according to an embodiment of the present invention may further include obtaining a natural language processing result based on the natural language query. Here, the step of generating the structured query may include obtaining a cross-attention result generated between a natural language processing result and a schema relationship and generating a structured query using the cross-attention result.

The natural language query processing method according to an embodiment of the present invention may further include obtaining a natural language processing result based on a natural language query using a pre-trained language model. Here, the step of obtaining the natural language processing result may be performed in a state where the update of the internal parameters of the language model is blocked.

The natural language query processing method according to the embodiment of FIG. 9 may include encoding a transformer neutral network-based natural language query and a relational database into a meaning representation.

In this case, although it is possible to use the same encoder as in the conventional technique, a method of pre-training by newly creating natural language query and SQL pair data may be proposed.

In order to solve problems such as lack of learning data for natural language queries and schema pairs, limitation of the number of input tokens in the natural language processing model (not applicable for schemas with a large number of columns and tables), and inefficient use of relationship information of inputs, the process of encoding the natural language query and schema may be separated in an embodiment of the present invention. Because a natural language query is similar to a general natural language sentence, it is possible to use a pre-trained language model without additional training and compute natural language element meaning representation.

The meaning representation for each table and column belonging to the table may be first computed for schema analysis, and the final meaning representation may be computed through interaction with other table information using a relation-aware transformer neural network. In this case, detailed relationship information between the tables in use may be predicted in the preprocessing process.

The conventional technique that encodes a natural language query and a schema simultaneously with one model has the problem of requiring training data for a natural language query and schema pair to pre-train the corresponding model. However, the proposed model can independently pre-train the schema encoding module because the natural language query and schema encoding processes/modules are separated.

In an embodiment of the present invention, the schema information may be generated from a table extracted from generalized data such as the Internet. Schema information can be learned unsupervised through masked language modeling. Pre-training only the schema encoder 242 module independently makes it possible to solve the problem of the conventional technique in that the pre-trained model and the input form mismatch.

In an embodiment of the present invention, it is possible to process a schema composed of a plurality of tables without exceeding the length limit because the natural language query and table information are each encoded by the language model 244.

In an embodiment of the present invention, the problem of the conventional technique in that interaction occurs without considering the connection relationship between tables can be solved in such a way of encoding tables first in unit of table and then encoding the schema using a relation-aware transformer considering the relationship of the tables.

According to an embodiment of the present invention, when a natural language query and a schema are given, relationship information between input values may be extracted through a preprocessing process.

The preprocessing process may include schema linking and schema relationship extraction.

In schema linking, relationship information between words w in a natural language query and table t or column c can be obtained.

In schema relationship extraction, the relationship between tables may be extracted through the relationship of inclusion between tables and columns, the primary-foreign key in the schema graph, and the relationship between table records.

When the preprocessing is finished, the pre-trained language model 244 may encode the natural language query to generate a natural language processing result. A schema relationship may be obtained by the pre-trained schema encoder 242. The natural language processing result may be computed as a natural language element meaning representation, and the schema relationship may be computed as a schema meaning representation.

When computing the schema meaning representation, the table relationship extracted in the preprocessing step may be used.

When the meaning representation for each input is primarily computed, the final meaning representation of the two inputs can be computed through information exchange between the natural language query and the schema through the relation-aware transformer. Here, it is possible to obtain information on which words in a natural language query are related to which schema entities based on the information extracted from the schema linking as a preprocessing step.

The schema linking process as part of the preprocessing process may be executed using 'a configuration of comparing and matching natural language sentences with a database in unit of word' as parts of the known techniques KR 10-2277787 "column and table prediction method for text to SQL query translation based on a neural network" and KR 10-2345568 "Semantic linking of natural language words with columns and tables in databases."

Figure 10:
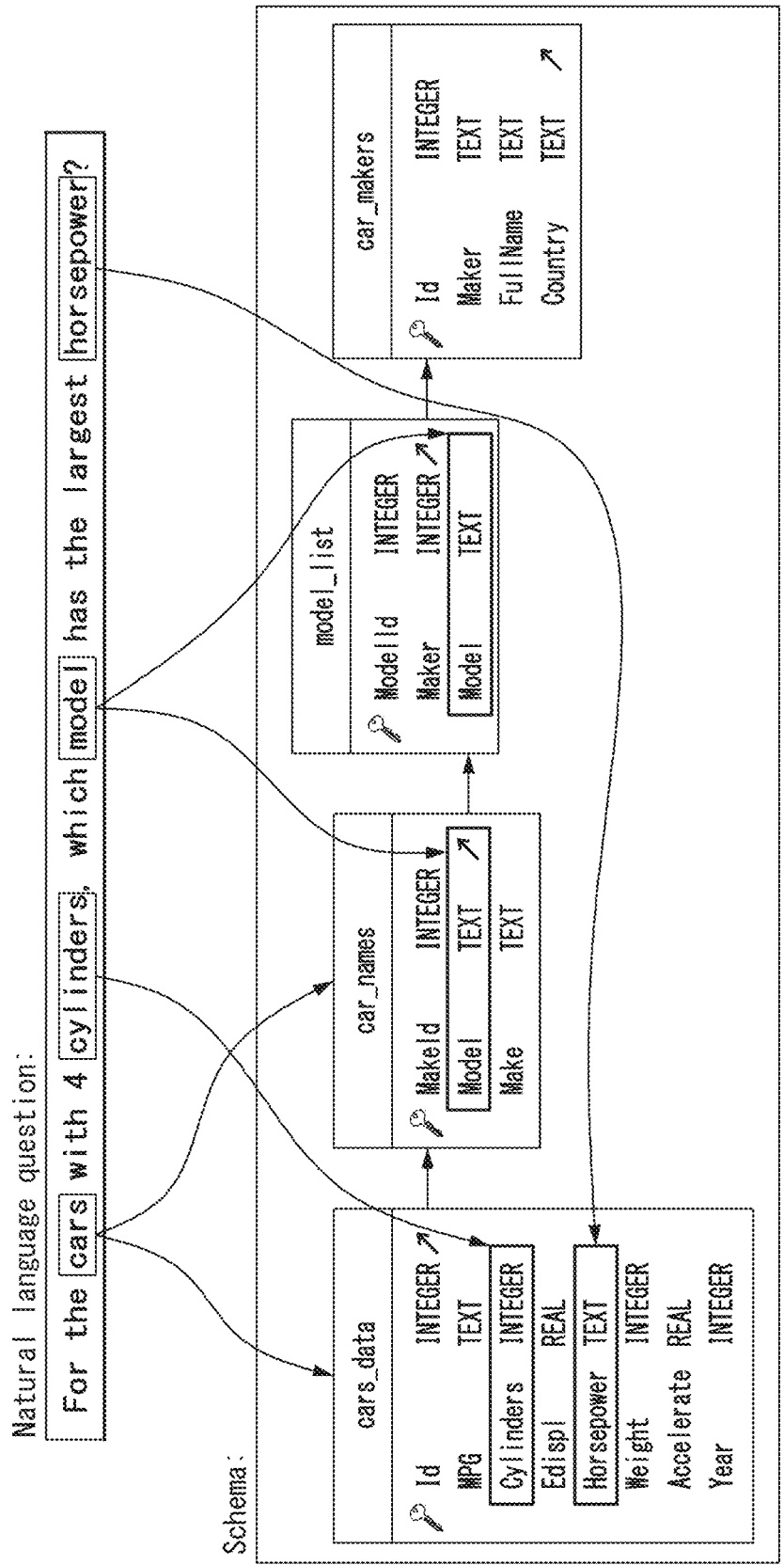
FIG. 10 is a conceptual diagram for explaining an example of a schema linking process, when a vehicle-related natural language query and schema are given, in a natural language query processing method performed in a natural language query processing apparatus according to an embodiment of the present invention.

FIG. 10 is a conceptual diagram for explaining an example of a schema linking process, when a vehicle-related natural language query and schema are given, in a natural language query processing method performed in a natural language query processing apparatus according to an embodiment of the present invention.

FIG. 10 shows an example of schema linking when a schema and a natural language query related to a vehicle are given.

With reference to FIG. 10, a natural language processing apparatus and/or an apparatus for encoding a natural language query and relational database into a meaningful representation based on a transformer neural network according to an embodiment of the present invention may perform a schema linking as an input text preprocessing process.

Schema linking is quite similar to entity linking as a problem-solving process except for finding an entity to be linked in the schema rather than the knowledge graph. That is, the word in the natural language query is linked to the table or column that the word means. As shown in FIG. 10, a word in a natural language query may be linked to one or more columns/tables. Schema linking is already used in several studies, and the schema linking algorithm of the conventional technique may be used at least partially if necessary in the present invention.

In schema linking, character string comparison for each word w of a given natural language query L is performed with each tablet in the schema. Here, if an exact matching word such as cylinders and horsepower is found as shown in FIG. 10, the word is linked. However, if there is no exact matching word, partial matching words are found and all found entities are linked. In this case, linking may be made in unit of word rather than partial matching character string. If there is no partial matching table, the same operation is repeated for columns.

Figure 11:
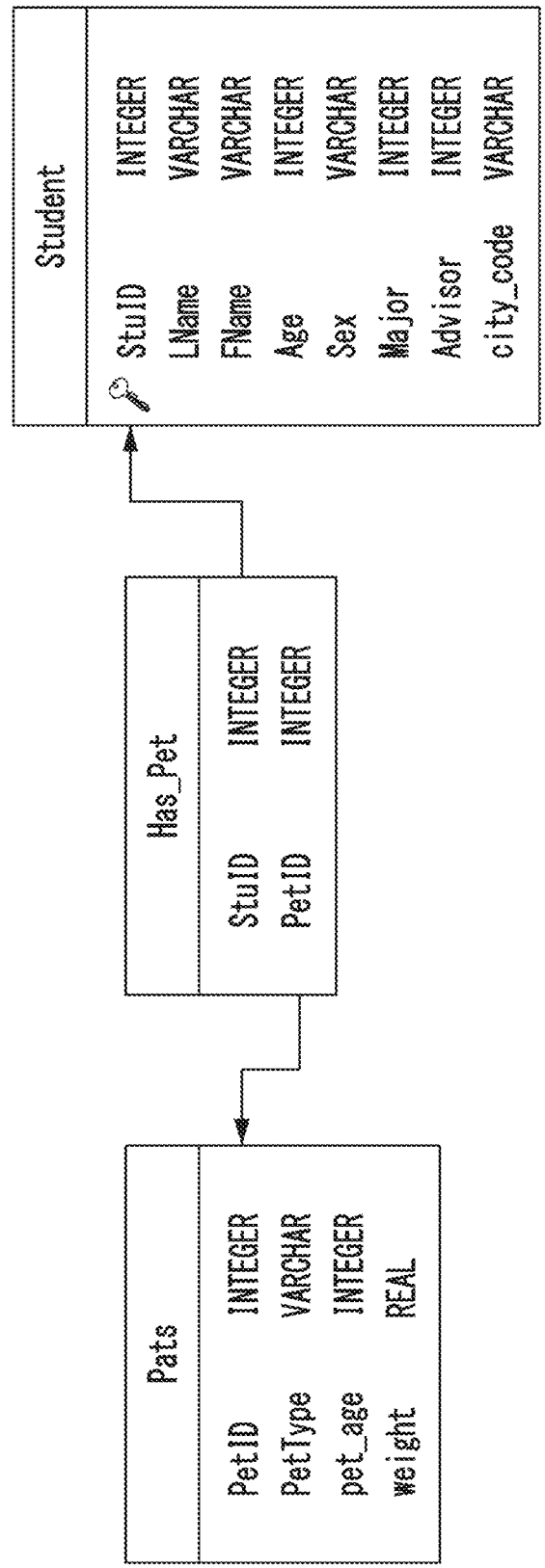
FIG. 11 is a conceptual diagram for explaining a natural language query being translated into a different structured query depending on the relationship between sub-databases (tables) in a natural language query processing method performed in a natural language query processing apparatus according to an embodiment of the present invention.

FIG. 11 is a conceptual diagram for explaining a natural language query being translated into a different structured query depending on the relationship between sub-databases (tables) in a natural language query processing method performed in a natural language query processing apparatus according to an embodiment of the present invention.

With reference to FIG. 11, extracting a table relationship is a process of finding a relationship between two tables, which is necessary for accurate query translation. As shown in FIG. 11, the same natural language query may be translated into a different SQL depending on the relationship between tables in the schema. SQL1 is the correct translation when the relationship between the student and has_pet tables is one-to-one, and SQL2 is the correct translation when the relationship is one-to-many.

That is, even for the same natural language query, the structured query in the case of the one-to-one correspondence between student and pet (has_pet) and the structured query in the case of the one-to-many correspondence between student and pet are not identical with each other. Therefore, in order to generate a correct structured query, schema relationships that are not directly included in the natural language query are further required.

Figure 12:
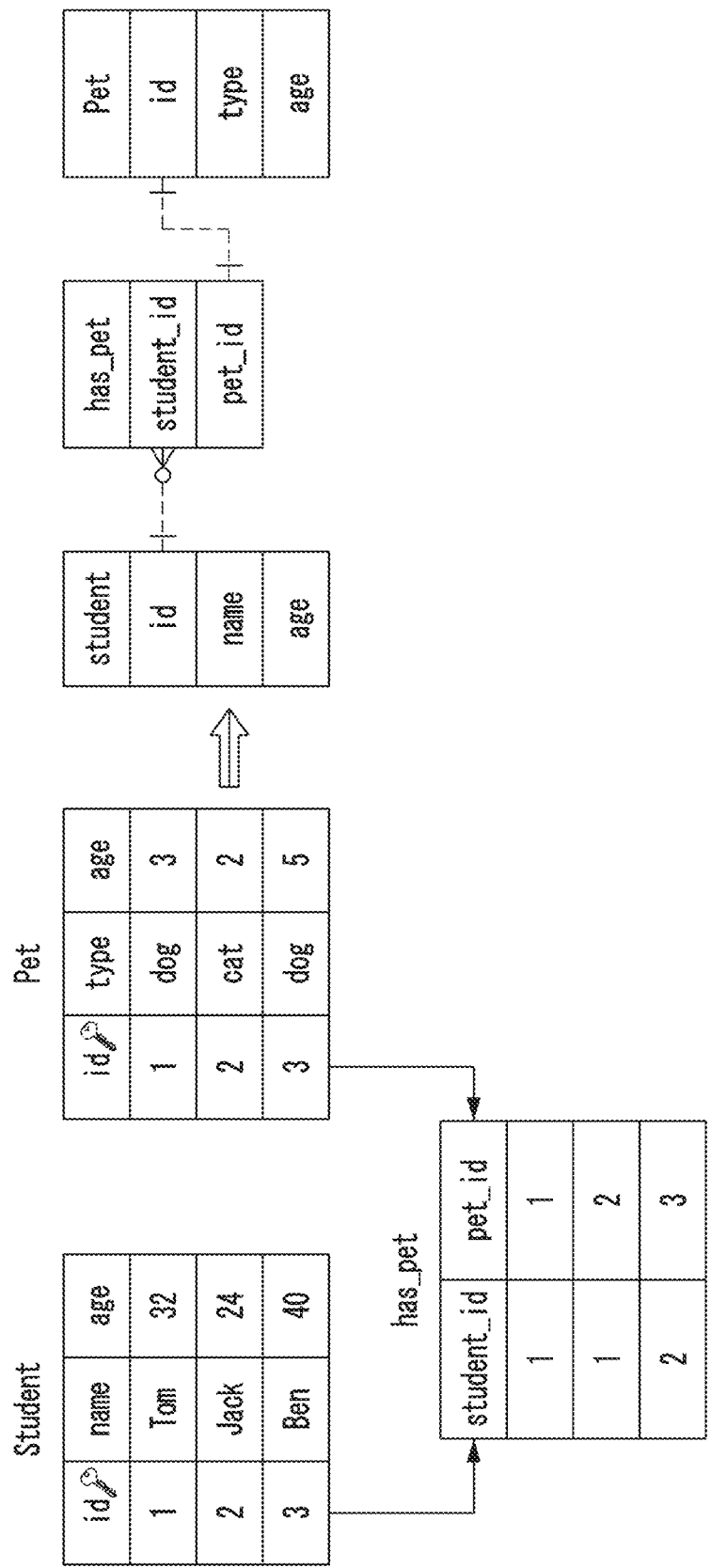
FIG. 12 is a conceptual diagram illustrating an example of extracting a relationship between sub-databases (tables) by using database record values in a natural language query processing method performed in a natural language query processing apparatus according to an embodiment of the present invention.

FIG. 12 is a conceptual diagram illustrating an example of extracting a relationship between sub-databases (tables) by using database record values in a natural language query processing method performed in a natural language query processing apparatus according to an embodiment of the present invention.

With reference to FIG. 12, in an embodiment of the present invention, a database record value is used for extracting a relationship between two tables.

When there is column C1 set as the primary key and column C2 set as the foreign key, values corresponding to respective columns in the table record are called V1 and V2. In this case, a one-to-many correspondence may be extracted if there is a duplicate value in V2, one-to-many, a one-to-one correspondence may be extracted if there is no duplicate value.

In addition, a mandatory relationship is extracted/predicted if the set of V1 and the set of V2 match, and an optional relationship may be extracted/predicted if the sets do not match.

With reference to FIG. 12, it can be seen that the relationship between the id of the student table and the student_id of the has_pet table is one-to-many optional. The relationship between the has_pet table and the pet table is one-to-one mandatory.

Figure 13:
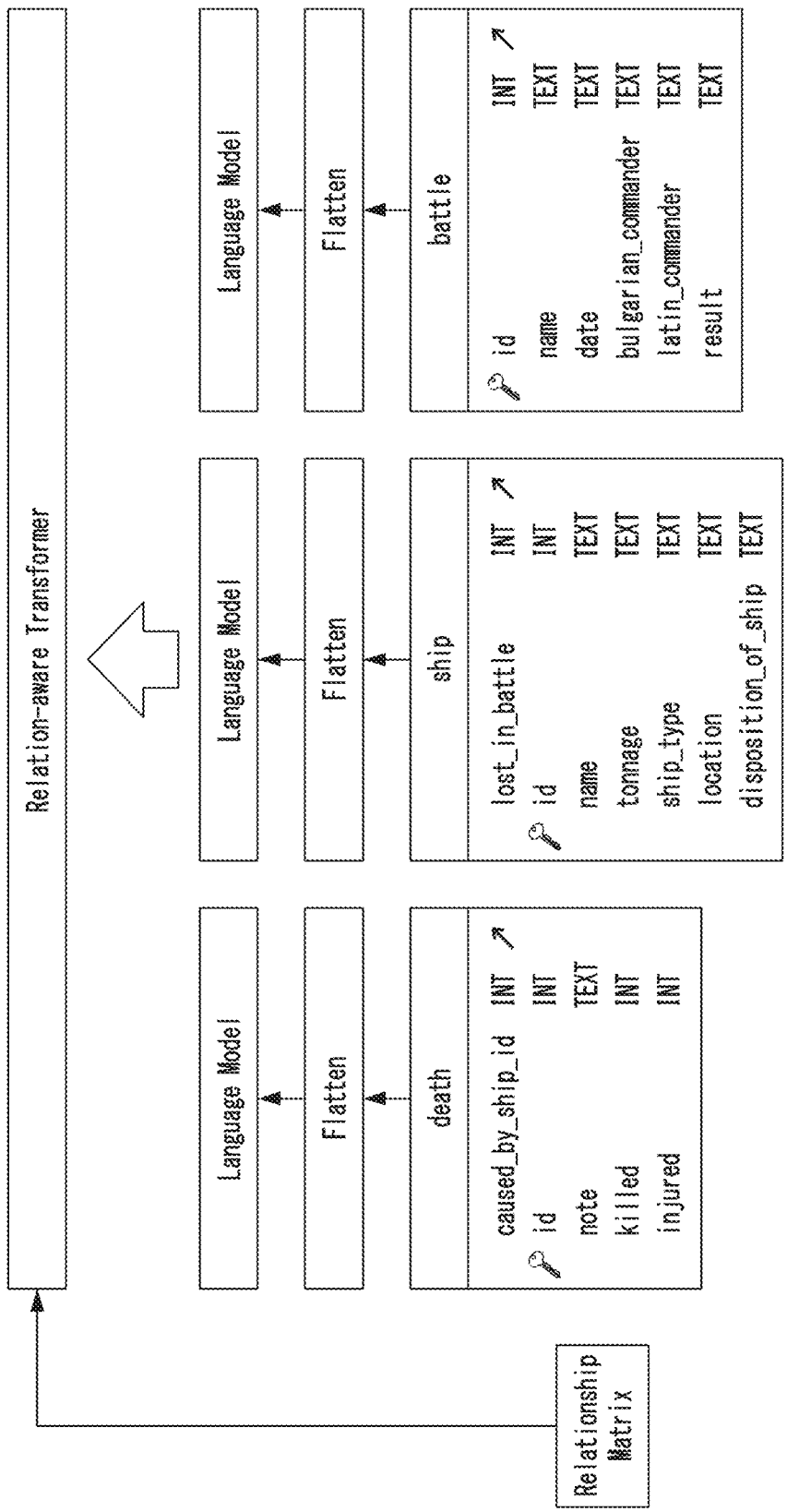
FIG. 13 is a conceptual diagram illustrating an example of schema encoding in a natural language query processing method performed in a natural language query processing apparatus according to an embodiment of the present invention.

FIG. 13 is a conceptual diagram illustrating an example of schema encoding in a natural language query processing method performed in a natural language query processing apparatus according to an embodiment of the present invention.

With reference to FIG. 13, in an embodiment of the present invention, a natural language query encoding step and a schema encoding step are performed as a meaning representation computation process.

For convenience of explanation, it is assumed that natural language query encoding is performed through the pre-trained language model BERT.

A natural language sentence is separated into tokens through byte-pair tokenization. Here, the vocabulary of the tokens in use is identical with that of BERT. Afterward, it is possible to obtain a meaning representation corresponding to each token by inputting a natural language query converted into a token to BERT. In this case, a meaning representation for each word w may be computed for the sentence L. In the case where a word is divided into several tokens, the meaning representation for each word may be computed by averaging the meaning representation of each token.

Schema encoding is divided into two steps as shown in FIG. 13. First, the meaning representation for each table t in schema S may be computed independently using the pre-trained language model BERT. In order to input the table information to BERT, a process of flattening the table information into a sentence may be performed. As the table information, the name of the table and the names of columns belonging to the table can be used. The process of flattening the table information into a sentence is as follows.

First, a table name may be tokenized and linked after a special token called [CLS] (classifier). Afterward, all column names belonging to the table may be tokenized and linked after the table name. Here, the columns are separated by placing a special token called [September] (separator) between the columns. The linked tokens are input to BERT to compute meaning representations for the respective tables and columns, and the schema may be encoded once again using a relation-aware transformer based on the relationship between tables extracted in the preprocessing step and relationship information between tables/columns.

According to an embodiment of the present invention, a computer program can be stored in computer-readable recordable medium implementing method of processing natural language query and/or method of encoding natural language queries and relational database into meaningful representation using transformer neural network.

According to an embodiment of the present invention, a computer-readable recordable medium can be provided to store a computer program implementing method of processing natural language query and/or method of encoding natural language queries and relational database into meaningful representation using transformer neural network.

According to embodiments disclosed in FIGS. 1-13, appropriate structured queries can be generated with extraction of relation of tables (sub-databases).

According to embodiments disclosed in FIGS. 1-13, input data sizes do not need to be limited because of separating learning of natural language processing and learning of schema encoding. Therefore, automatic translation of natural language queries about big databases using hundreds of columns practically required in enterprises.

According to embodiments disclosed in FIGS. 1-13, there is suggested that schema encoding uses relational transformer (neural network) and natural language encoding using pre-learned language model.

According to embodiments disclosed in FIGS. 1-13, schema relation can be encoded regardless of the number of tables because language models can be individually applied to respective tables.

According to embodiments disclosed in FIGS. 1-13, schema relation for generating structured queries can be encoded using relational information between predicted tables.

According to embodiments disclosed in FIGS. 1-13, sub-database information can be acquired to be focused regarding relations between natural language and schema, using cross-attentions.

According to embodiments disclosed in FIGS. 1-13, words from among natural language can be extracted to be focused regarding relations between the schema. It means, word can be specified to be much related to which schema.

According to embodiments disclosed in FIGS. 1-13, generation of structured queries can be improved because the specific elements can be identified to be focused from among the natural language and schema respectively using cross-attention.

Figure 14:
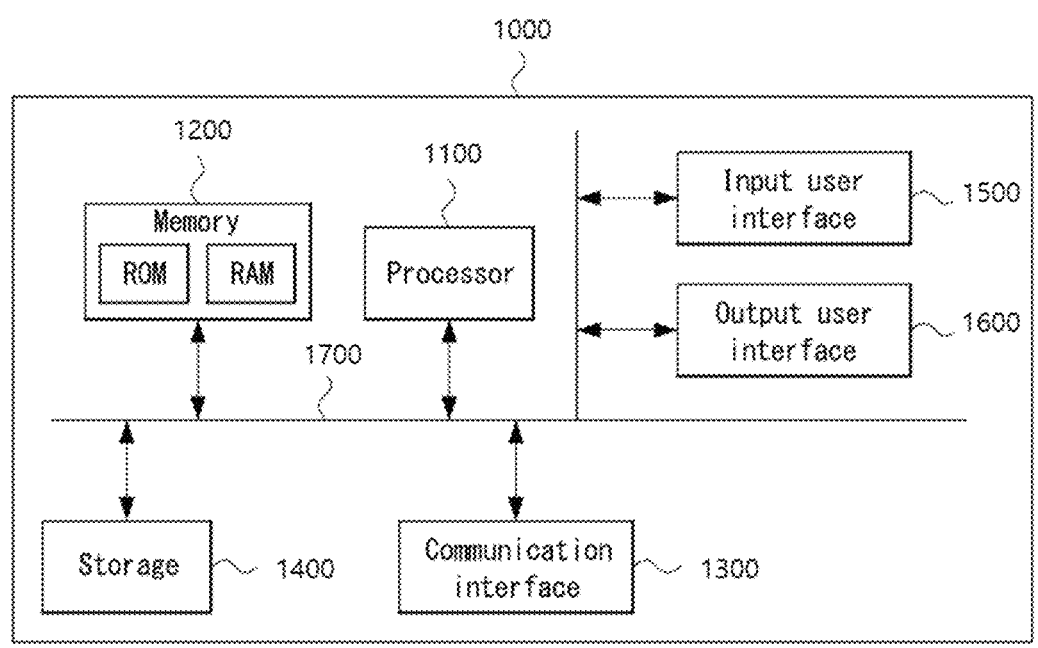
FIG. 14 is a block diagram showing a generalized configuration of a natural language processing apparatus, a natural language query processing apparatus, and a computing system according to an embodiment of the present invention, capable of performing at least of processes disclosed in embodiments of FIGS. 1 through 13.

FIG. 14 is a block diagram showing a generalized configuration of a natural language processing apparatus, a natural language query processing apparatus, and a computing system according to an embodiment of the present invention, capable of performing at least of processes disclosed in embodiments of FIGS. 1 through 13.

According to embodiments disclosed in FIGS. 1-3, the dialogue manager 220, the query translator 240, and answering engine 260 can be electronically connected to process and memories, and controlled/managed by the processor.

According to embodiments disclosed in FIGS. 4-13, respective entities can be electronically connected to process and memories, and controlled/managed by the processor.

At least a part of the natural language processing method according to an embodiment of the present invention may be executed by the computing system 1000 of FIG. 14.

Referring to FIG. 14, the computing system 1000 according to an embodiment of the present invention may include a processor 1100, a memory 1200, a communication interface 1300, a storage device 1400, an input interface 1500, and an output interface 1600 and a system bus 1700.

The computing system 1000 according to an embodiment of the present invention may include at least one processor 1100 and a memory 1200 stores instructions for invoking the at least one processor 1100 to perform at least one step of the method according to an embodiment of the present invention The at least one step of the method may be performed by the at least one processor 1100 loading and executing instructions from the memory 1200.

The processor 1100 may imply a central processing unit (CPU), a graphics processing unit (GPU), or a dedicated processor on which methods according to embodiments of the present invention can be performed.

Each of the memory 1200 and the storage device 1400 may be configured as at least one of a volatile storage medium and a non-volatile storage medium. For example, the memory 1200 may be configured as at least one of a read only memory (ROM) and a random access memory (RAM).

The computing system 1000 may include a communication interface 1300 for performing communication through a wireless network.

The computing system 1000 may further include a storage device 1400, an input interface 1500, an output interface 1600, and the like.

In addition, each component included in the computing system 1000 may be connected by a bus 1700 to communicate with each other.

For example, a computer system 1000 can be implemented as at least one of a communicable desktop computer, a laptop computer, a notebook, a smart phone, a tablet PC, a mobile phone, mobile phone, smart watch, smart glass, e-book reader, PMP (portable multimedia player), portable game console, navigation device, digital camera, DMB (digital multimedia broadcasting) player, digital audio recorder, digital audio player, digital video recorder, digital video player, PDA (Personal Digital Assistant), etc.

According to an embodiment of the present invention, it is possible to improve the performance of a translation system by more accurately computing the meaning representation of the natural language query and the database schema required for translating natural language queries into standardized/structured queries such as structured query language (SQL) queries.

According to an embodiment of the present invention, there may be provided a query response result desired by a user by automatically generating a structured query even when a user inputs a natural language query without knowledge of the structured query.

According to an embodiment of the present invention, there may be generated a structured query matching a user's intention and provide a query response result by pre-analyzing and encoding schema information that can be obtained only from a natural language query input by a user.

According to an embodiment of the present invention, there may be generated a structured query and query response result in the case where a user inputs a natural language query with an advanced scheme.

According to an embodiment of the present invention, there may be proposed a new cross-attention-based neural network structure that advances the process of generating a structured query in response to a natural language query input.

According to an embodiment of the present invention, there may be proposed a schema relation extraction technique based on the relationship between sub-databases that advances the process of generating a structured query in response to a natural language query input.

The method according to an embodiment of the present disclosure may be implemented as a computer-readable program or code on computer-readable recording media. Computer-readable recording media include all types of recording devices in which data readable by a computer system are stored. The computer-readable recording media may also be distributed in a network-connected computer system to store and execute computer-readable programs or codes in a distributed manner.

The computer-readable recording medium may also include a hardware device specially configured to store and execute program instructions, such as a read only memory (ROM), a random access memory (RAM), and a flash memory. The program instructions may include not only machine language codes such as those generated by a compiler, but also high-level language codes that executable by a computer using an interpreter or the like.

Although some aspects of the present disclosure have been described in the context of an apparatus, it may also represent a description according to a corresponding method, wherein a block or apparatus corresponds to a method step or feature of a method step. Similarly, aspects described in the context of a method may also represent a corresponding block or item or a corresponding device feature. Some or all of the method steps may be performed by (or using) a hardware device, e.g., a microprocessor, a programmable computer, or an electronic circuit. In some embodiments, one or more of the most important method steps may be performed by such an apparatus.

In embodiments, a programmable logic device, e.g., a field programmable gate array, may be used to perform some or all of the functions of the methods described herein. In embodiments, the field programmable gate array may operate in conjunction with a microprocessor to perform one of the methods described herein. In general, the methods are preferably performed by a certain hardware device.

Although described above with reference to the preferred embodiments of the present disclosure, it should be understood that those skilled in the art can variously modify and change the present disclosure within the scope without departing from the spirit and scope of the present disclosure as set forth in the claims below.

What is claimed is:

1. A natural language query processing apparatus comprising:
a processor is configured to receive a natural language query input by a user and generate a structured query based on the natural language query,
wherein the processor, when generating the structured query based on the natural language query, is further configured to generate the structured query using:
a natural language processing result for the natural language query;
a schema relationship extracted based on a relationship between a first sub-database and a second sub-database in a database related to the natural language query; and
a cross-attention result generated between the natural language processing result and the schema relationship, and
wherein the first sub-database indicates a first table includes a first entry regarding a first key, and the second sub-database indicates a second table includes a second entry regarding a second key, the schema relationship includes a determination regarding a relationship between the first key and the second key as either one of one-to-one mandatory correspondence and one-to-many optional correspondence.

2. The apparatus of claim 1, wherein the processor is further configured to generate the structured query using a first cross-attention result indicating relevance of the natural language processing result to the schema relationship and a second cross-attention result indicating a relevance of the schema relationship to the natural language processing result,
wherein the cross-attention result comprises the first cross-attention result and the second cross-attention result.

3. The apparatus of claim 1, further comprising:
a natural language processing model generating the natural language processing result based on the natural language query; and
a schema encoder model outputting the schema relationship.

4. The apparatus of claim 3, wherein the schema encoder model outputs a schema meaning representation as the schema relationship based on an input schema graph, and the natural language processing model receives an input of a preprocessing result of the natural language query and outputs a natural language element meaning representation as the natural language processing result.

5. The apparatus of claim 3, further comprising:
a first cross-attention layer generating a first cross-attention result indicating relevance of the natural language processing result to the schema relationship; and
a second cross-attention layer generating a second cross-attention result indicating a relevance of the schema relationship to the natural language processing result,
wherein the cross-attention result comprises the first cross-attention result and the second cross-attention result.

6. The apparatus of claim 3, wherein the natural language processing model comprises a first internal attention layer having a self-attention function inside thereof, and the schema encoder model comprises a second internal attention function layer having at least one of a self-attention function and a cross-attention function inside thereof.

7. The apparatus of claim 6, wherein the processor blocks update of parameters inside of the natural language processing model based on an output of the first internal attention layer.

8. The apparatus of claim 3, wherein the processor blocks update of parameters inside of the natural language processing model based on the cross-attention result.

9. The apparatus of claim 3, further comprises a decoder layer generating the structured query based on the cross-attention result.

10. A natural language query processing method executed by a computing system including a processor, the method comprising:
receiving a natural language query input by a user; and
generating a structured query based on the natural language query,
wherein the step of generating the structured query comprises:
acquiring a natural language processing result for the natural language query;
acquiring a schema relationship extracted based on a relationship between a first sub-database and a second sub-database in a database related to the natural language query;
acquiring a cross-attention result generated between the natural language processing result and the schema relationship; and
generating the structured query using the cross-attention result, and
wherein the first sub-database indicates a first table includes a first entry regarding a first key, and the second sub-database indicates a second table includes a second entry regarding a second key, the schema relationship includes a determination regarding a relationship between the first key and the second key as either one of one-to-one mandatory correspondence and one-to-many optional correspondence.

11. The method of claim 10, wherein the step of acquiring the cross-attention result comprises:
acquiring a first cross-attention result indicating relevance of the natural language processing result to the schema relationship; and
acquiring a second cross-attention result indicating a relevance of the schema relationship to the natural language processing result.

12. The method of claim 10, wherein the step of acquiring the schema relationship comprises acquiring a schema meaning representation as the schema relationship based on an input schema graph, and the step of acquiring the natural language processing result comprises receiving an input of a preprocessing result of the natural language query and acquiring a natural language element meaning representation as the natural language processing result.

13. The method of claim 10, wherein the step of acquiring the natural language processing result is performed in a state where update of parameters inside of a natural language processing model based on an output of an internal attention layer is blocked.

14. The method of claim 10, wherein the step of acquiring the natural language processing result is performed in a state where update of parameters inside of a natural language processing model based on the cross-attention result is blocked.

15. A natural language query processing method executed by a computing system including a processor, the method comprising:

extracting a schema relationship between a first sub-database and a second sub-database in a database related to a natural language query as one of one-to-one mandatory correspondence and one-to-many optional correspondence; and generating a structured query from the natural language query based on the schema relationship, wherein the first sub-database indicates a first table includes a first entry regarding a first key, and the second sub-database indicates a second table includes a second entry regarding a second key, the schema relationship includes a determination regarding a relationship between the first key and the second key as either one of the one-to-one mandatory correspondence and the one-to-many optional correspondence.

16. The method of claim 15, further comprising predicting the schema relationship as one of a mandatory relationship and an optional relationship through comparison between the first sub-database and the second sub-database.

17. The method of claim 15, further comprising encoding the schema relationship using a first natural language module corresponding to the first sub-database among sub-databases and a second natural language model corresponding to the second sub-database among the sub-databases.

18. The method of claim 15, further comprising pre-encoding at least part of the schema relationship using masked column modeling for part of sub-databases including the first sub-database and the second sub-database.

19. The method of claim 15, further comprising acquiring a natural language processing result based on the natural language query, wherein the step of generating the structured query comprises:

acquiring a cross-attention result generated between the natural language processing result; and the schema relationship; and generating the structured query using the cross-attention result.

20. The method of claim 15, further comprising acquiring a natural language processing result based on the natural language query using a pre-trained language model, wherein the step of acquiring the natural language processing result is performed in a state where update of internal parameters of the pre-trained language model is blocked.

\* \* \* \* \*